United States Patent [19]

Camelon et al.

[11] 3,941,731

[45] Mar. 2, 1976

[54] POWDER PAINTS CONTAINING ALUMINUM AND NICKEL II

[75] Inventors: Melville J. Camelon, Utica; Rodney C. Gibeau, Mount Clemens, both of Mich.

[73] Assignee: Ford Motor Company, Dearborn, Mich.

[22] Filed: Sept. 16, 1974

[21] Appl. No.: 506,491

Related U.S. Application Data

[63] Continuation-in-part of Ser. No. 422,470, Dec. 6, 1973, abandoned.

[52] U.S. Cl. .......... 260/17 R; 260/40 R; 260/42.14; 260/42.16; 260/42.22; 260/42.26; 260/42.27; 260/42.28; 260/42.29; 260/42.55; 260/836; 260/837 R; 260/856; 260/857 UN; 260/862; 260/897 B; 260/898; 260/901; 427/195
[51] Int. Cl.$^2$.... C08K 3/08; C08K 9/04; C08K 9/10
[58] Field of Search............ 260/42.14, 42.22, 40 R, 260/17 R, 42.16; 106/290, 291

[56] References Cited
UNITED STATES PATENTS

| | | | |
|---|---|---|---|
| 3,532,530 | 10/1970 | Denison et al. | 117/17 |
| 3,532,662 | 10/1970 | Ansdell | 260/34.2 |
| 3,575,900 | 4/1971 | Ponyik | 260/21 |
| 3,692,731 | 9/1972 | McAdow | 260/32.8 R |
| 3,730,930 | 5/1973 | Labana | 260/23 EP |
| 3,781,379 | 12/1973 | Theodore | 260/836 |

FOREIGN PATENTS OR APPLICATIONS

| | | | |
|---|---|---|---|
| 748,410 | 5/1956 | United Kingdom | 106/290 |

*Primary Examiner*—James H. Derrington
*Attorney, Agent, or Firm*—Olin B. Johnson; Keith L. Zerschling

[57] ABSTRACT

Improved powder paint compositions employing particulate metal color producing components comprise a unique combination of (a) aluminum flakes individually encapsulated in a thin, thermoplastic organic film-former (b) nickel powder, and (c) the principal film-former of the powder paint composition in particulate form. The encapsulated aluminum flake is prepared by intimately dispersing the aluminum flake in a solution of the thermoplastic, organic film-former of controlled concentration and spray drying the resultant dispersion. In the preferred embodiment, the principal film-former of the powder paint composition is also a thermoplastic material and, in the most preferred embodiment, it is also of the same composition as the principal film-former of the powder coating composition.

21 Claims, No Drawings

POWDER PAINTS CONTAINING ALUMINUM AND NICKEL II

RELATION TO PARENT APPLICATION

This application is a continuation-in-part of copending U.S. Pat. application Ser. No. 422,470 filed Dec. 6, 1973 under the same title and now abandoned. This application contains the illustrative examples of the parent application and additional illustrative wherein the amounts of thermoplastic film-forming material deposited on the metal particles prior to their incorporation into a powder paint are above that illustrated in the parent. The recitational disclosures as to the same in the body of the specification are conformed to take into account the additional examples.

BACKGROUND OF THE INVENTION

One basic technique for the manufacture of powder coating materials is the so-called fusion method. This involves the mixing of solvent-free raw materials in their molten state, usually via some form of extruder, cooling, pulverization and size separation-classification. This method has a number of disadvantages unrelated to pigmentation and an additional short-coming when metal flakes are employed as pigments. The high shear employed in the mixing stage results in deformation of the metal flakes. Additionally, during the pulverization step, the metal flakes are further deformed and reduced in particle size. Coatings produced from such powders are characterized by a low level of brilliance and poor polychromatic appearance.

Another basic technique for the manufacture of powder coating materials is the so-called solution-preparation, solvent-separation technique which can be effected by more than one method. This general technique involves the preparation of a coating material in an organic solvent, separation of the solvent from the paint solids, and size-separation classification. Also, pulverization in some form may or may not be required depending upon the solvent separation method involved.

The separation of the solvent can be carried out by conventional spray drying techniques or by heat exchange separation wherein the components of a paint solution are separated by volatilization of the more volatile solvent and separation of the volatilized solvent from the nonvolatilized paint solids by gravitational forces. Since the metal flakes can be added after pulverization, if pulverization is required when using any of the solvent separation methods, damage to the metal flakes during pulverization can be avoided by using the solution preparation-solvent-separation technique. Problems do arise, however, with respect to distribution and orientation of the metal flakes when the powder coating material is applied to the substrate to be coated. This is particularly true when the method of application is that of electrostatic spray, the method most commonly employed to apply the final coating of paint to automobiles and a variety of other metal manufacturers. In such applications, the flakes tend to orient in a random fashion with a low percentage of the flakes parallel to the substrate. The net result is a high degree of metal protrusion with little metallic brilliance and a low gloss factor.

Thus, when either of the aforedescribed methods are used to produce metal-pigmented, powder-paint coatings in accordance with the prior art processes, a substantially higher aluminum to non-metal pigment ratio is required, relative to the same ratio in liquid paints, in order to achieve the same degree of brightness and metallic appearance obtained with liquid paints. Further, the problem of metal flake protrusion remains even when brightness and metallic appearance are achieved.

In liquid paints, it is known to partially coat aluminum flakes used as pigments to increase the electrostatic spray efficiency of such paints. In U.S. Pat. No. 3,575,900 a method is disclosed for precipitating the resin of the solution coating upon the aluminum flake in colloidal form. This solution is then used as such or mixed with another solution for use. The patentee specifically points out that, while it may be convenient to call this encapsulation, it is not intended to denote that the aluminum particles are completely enveloped. The resin disclosed for this purpose is a copolymer of vinyl chloride and monoethylenically unsaturated monomers containing about 60 to about 90% by weight vinyl chloride. Aluminum flake is also partially coated in U.S. Pat. No. 3,532,662. Here the coating was carried out with a random copolymer of methyl methacrylate and methacrylic acid adsorbed on the pigment. By this method, a dispersion is made of the solid particles in a liquid continuous phase comprising an organic liquid containing in solution a polymer which is adsorbed by the particles and a stabilizer, and modifying the polarity of the continuous phase so that the polymer is insoluble therein, the stabilizer being a compound containing an anchor component which becomes associated with the adsorbed polymer on the particle surface and a pendant chain-like component which is solvated by the modified continuous phase and provides a stabilizing sheath around the particles. It is alleged that this improves the "wetting" of the treated particles by the film-forming material dispersion-type coating composition.

Powder paints have certain advantages over conventional liquid paints in that they are essentially free of volatile solvents but they also present problems which differ from the problems encountered with liquid paints. These differences include differences with respect to employment of aluminum flakes as a color producing component. For instance, when flakes partially coated by resin precipitate are employed in liquid paints, there remains the organic solvent and other components of the solution to prevent direct exposure of the flake to the atmosphere and other external influences. Further, in powder paints, if aluminum flake is coated, the coating must be a relatively dry solid and the size, weight and continuity of the organic encapsulation are all factors in affecting the distribution of such particles when electrostatically sprayed with the powder that is the principal film-former of the coating composition.

Coated aluminum flakes, i.e., aluminum flakes individually encapsulated in a continuous thermopolastic film, admixed with the particulate principal film-former of a powder paint and electrostatically sprayed on a metal substrate will in a substantial portion orient in parallel relationship to the substrate. This substantially reduces or eliminates flake protrusion. Unfortunately, however, there remains a tendency for these coated flakes to assume a substrate-parallel orientation close to the outer surface of the cured coating. This can produce two undesired results. The first of these is the insufficient appearance of metallic depth in the coating wherein the metal flakes are seen through varying depths of a film which is usually colored with a non-metal color producing component. The second is an undesired "silvery" effect which dominates the non-metal color producing component if the concentration of the near-surface, substrate-parallel flakes is too high.

THE INVENTION

A dominance of "silvery" effect in polychromatic finishes resulting from an overabundance of aluminum flake near and parallel to the outer surface of a cured coating is avoided and depth variation for the metal color producing component in polychromatic or monochromatic finishes is achieved by icluding in a powder coating composition a combination of (1) aluminum flakes encapsulated in a thin, continuous, coating of thermoplastic, organic film-former and (2) nickel powder.

As these metal pigments are most frequently used in polychromatic finishes, the powder coating composition will ordinarily contain at least one non-metal color producing component. The "non-metal color producing component" may be a particulate pigment, dye or tint and may be either organic, e.g., carbon black, or inorganic, e.g., a metal salt.

Aluminum flakes which are incorporated in powder paints to provide a metallic color producing component are herein encapsulated in a thin, continuous, thermoplastic organic coating through which the aluminum particle is visible to the human eye. This coating is preferably transparent but may be translucent. The term "substantially transparent" as used herein means materials which are either transparent or translucent or partially transparent and partially translucent.

The nickel powder used as the second metal color producing-component does not require encapsulation. Suitable nickel powder for use as particulate pigment is available from a variety of sources. Advisedly, this powder is of a size that will pass through a 400, preferably a 325, mesh screen or finer. The nickel powder is ordinarily in the form of flakes.

In accordance with this invention, the total metal color producing component quantitatively can be the same as where aluminum flake alone is employed although the difference in the densities of aluminum and nickel will make a weight difference when the particles are quantitatively equal to an all aluminum pigmentation. In accordance with this invention one employs a nickel to coated aluminum ratio of between about 1:4 and about 5:1. The preferred range is about 1.5:1 to about 2.5:1.

In accordance with this invention, the encapsulated aluminum flakes and the nickel powder are admixed, i.e., cold blended, with the balance of the coating material after the principal film-former is in particulate form. The encapsulated flakes may be admixed before, after or simultaneously with nickel powder. The non-metal color producing component may be admixed with the film-forming powder before, after or during the addition of the coated aluminum flakes and/or the nickel powder. In the preferred embodiment, the non-metal color producing component is added before the metal color producing components, i.e., the coated aluminum flakes and the nickel powder.

The aluminum color producing component is most often aluminum flakes in the form of aluminum paste. To avoid unnecessary complication of the description of this invention, such aluminum flakes will be used to illustrate the invention. It should be understood, however, that this method is applicable to any particulate aluminum used as a color producing component in a powder coating material. This includes aluminum particles which are solely aluminum, aluminum coated organic particles and polymer-sandwiched metal particles having exposed metal edges.

The film-former used to coat the metal particles in accordance with this invention may be the same as or different than the principal film-former of the powder coating material. The film-former used to coat the metal particles is an organic, thermoplastic, film-former that is soluble in the volatile solvent used for spray drying.

The preferred method for coating the aluminum flakes is to disperse the flakes, preferably in the form of aluminum paste, in a small amount of thermoplastic organic film-former and a solvent for the film-former that is suitable for spray drying. The dispersion is then spray dried by conventional spray drying techniques. Since there is a small amount of film-former relative to the amount of metal flakes, the net result is a metal flake coated with a relatively thin, continuous, coating of the film-former as opposed to a metal flake imbedded in a relatively large particle of the film-former.

More specifically, one first disperses the aluminum flakes in about 2 to about 200 weight percent of thermosettable film-former, based on the actual weight of aluminum flakes, i.e., about 2 to about 200 parts by weight of thermosettable film-former per 100 parts by weight aluminum flakes. In one embodiment wherein the coating of such flakes is relatively light, the aluminum flakes are dispersed in about 2 to about 30 weight percent of thermosettable film-former based on the actual weight of the aluminum flakes, i.e., about 2 to about 30 parts by weight of thermosettable film-former per 100 parts by weight aluminum flakes. In most applications, it will be found advantageous to use between 10 and 200, preferably between about 30 and about 70, parts by weight of thermosettable film-former per 100 parts by weight aluminum flakes. When metal particles of different density are used, the weight of aluminum flakes of the same surface area can be used to determine the amount of film-former to use in coating the metal particles. When less than about 2 weight percent of the film-former is used, complete encapsulation of the metal flakes may not result. When more than about 30 weight percent of the film-former is used, care must be taken in controlling the spray drying operation to minimize the formation of an excessive amount of spherical particles containing more than one metal flake. The incidence of full coverage is high in the 30 to 70 range above described. Such spherical particles can be removed from the other coated aluminum flakes by screening. The inclusion of large, multileafed particles in a cured coating provides an irregular appearance. A similar result may be obtained if one mixes the uncoated metal flakes with the principal film-former of a powder paint while the latter is in liquid state and then removes the solvent.

Aluminum paste is aluminum flakes, usually about 60 to about 70 weight percent, in a smaller amount, usually about 30 to about 40 weight percent, of a liquid hydrocarbon solvent which serves as a lubricant, e.g., mineral spirits. A small amount of an additional lubricant, e.g., stearic acid, may be added during the milling operation which produces the aluminum flakes. Everett J. Hall is credited with originating the method of beating aluminum into fine flakes with polished steel balls in a rotating mill while the flakes are wet with a liquid hydrocarbon. See U.S. Pat. No. 1,569,484 (1926). A detailed description of aluminum paste, its manufacture, flake size, testing, uses in paint, etc. is found in Aluminum Paint and Powder, J. D. Edwards and Robert I. Wray, 3rd Ed. (1955), Library of Congress Catalog Card Number: 55–6623, Reinhold Publishing Corporation, 430 Park Avenue, New York, New York, U.S.A. and the same is incorporated herein by reference.

The thermoplastic film-former used to coat the aluminum flakes may be the same as or different from the principal film-former of the powder coating composition. When the principal film-former is thermoplastic, it is preferred to have the filmformed used to coat the aluminum flakes of the same composition as the principal film-former.

The best acrylic, thermoplastic, powder coatings known to applicants are copolymers of alpha-beta olefinically unsaturated monomers. These are made up either solely or predominantly of acrylic monomers, i.e., in excess of 51 weight percent acrylic monomers, the balance is made up of $C_8$–$C_{12}$ monovinyl hydrocarbons, e.g., styrene, vinyl toluene, alpha methyl styrene, tertiary butyl sytrene, and acrylic or methacrylic acid. The acrylates and methacrylates used in either of these embodiments are preferably esters of a $C_1$–$C_8$ monohydric alcohol and acrylic acid or methacrylic acid or mixture of acrylic and methacrylic acids. Thus, such a copolymer could contain about 46 to 100 weight percent of esters of a $C_1$–$C_8$ monohydric alcohol and acrylic or methacrylic acid, 0 to about 49 weight percent of $C_8$–$C_{12}$ monovinyl hydrocarbons, and 0 to about 5 weight percent acrylic or methacrylic acid with the sum of the aforementioned esters and acrylic or methacrylic acid comprising in excess of 51 weight percent of the comonomers as stated earlier in this paragraph. One such copolymer contains about 76 to about 81 mole percent methyl methacrylate, 1 to 3 mole percent acrylic acid or methacrylic acid or a mixture of acrylic and methacrylic acids, and 16 to 23 mole percent butyl methacrylate.

One thermoplastic film-former preferred for use as the principal film-former is an acrylic polymer having a molecular weight ($\overline{M}_n$) in the range of 30,000 to 80,000 and a glass transition temperature in the range of 60°C. to 110°C. and is exemplified by the thermoplastic acrylic powder coating composition disclosed in U.S. Pat. application Ser. No. 172,227 filed Aug. 16, 1971 and now abandoned for continuation-in-part application Ser. No. 442,290 filed Feb. 12, 1974 and continuation-in-part application Ser. No. 442,291 filed Feb. 12, 1974. The disclosures of this patent application are incorporated herein by reference. Ideal for coating the aluminum flakes for use with these paints are polymeric mixtures of the same composition but of lower molecular weight.

When a thermoplastic film-former is chosen for use in coating the aluminum flakes in accordance with this invention, such material should be operationally compatible with the principal film-former to be chosen for the principal film-former. Also the volatile solvent or solvents employed to carry out the solution coating and spray drying steps are chosen with a view to the solvency of the coating material and their effectiveness in spray drying. Starting with this concept, the details for a given flake coating or given principal film-former are, of course, well within the skill of the paint makers art. With the foregoing in mind, other thermoplastic film-formers which can be used to encapsulate the aluminum flake include, but not by way of limitation (1) acrylic homopolymers, e.g., poly (methyl methacrylate), poly (acrylonitrile), poly (ethyl methacrylate), and poly (methyl acrylate), (2) acrylic copolymers, e.g., ethylmethyl acrylate copolymers, ethylene-ethyl acrylate copolymers, and ethylene-ethyl methacrylate copolymers (3) vinyl hydrocarbon - acrylic copolymers, e.g., sytrene-methyl methacrylate copolymers, styrene-methyl acrylate copolymers, and styrene-ethyl acrylate copolymers, (4) vinyl hydrocarbon monopolymers, e.g., polystyrene, (5) ethylene allyl copolymers, e.g., ethylene-allyl alcohol copolymers, ethylene-allyl acetate copolymers, and ethylene-allyl benzene copolymers, (6) cellulose derivations, e.g., cellulose acetate, cellulose butyrate, cellulose propionate, cellulose acetate propionate and ethyl cellulose, (7) polyesters, (8) polyamides, e.g. polyhexamethylene adipamide, polyhexamethylene sebacamide, and polycaproloctam, (9) poly (vinyl butyral), (10) poly (vinyl alcohol), and (11) poly (vinyl acetal), (12) ethylene vinyl acetate copolymers, (13) ethylene-vinyl alcohol copolymers, Thermoplastic powder coating materials, their preparation and use are disclosed in U.S. Pat. No. 3,532,530 which is incorporated herein by reference.

The principal film-former of the paint with which the thermoplastic coated aluminum flakes is blended may be a thermosettable film-former. The preferred film-formers for this purpose include thermosettable copolymer systems comprising: (a) an epoxy-functional copolymer of monovinyl monomers and as crosslinking agent therefor a $C_4$–$C_{20}$, saturated, straight chain, aliphatic, dicarboxylic acid crosslinking agent — exemplified by U.S. Pat. application Ser. No. 172,236 filed Aug. 16, 1971, now U.S. Pat. No. 3,752,870; (b) an epoxy-functional copolymer of monovinyl monomers and as crosslinking agent therefor a mixture of about 90 to 98 percent by equivalent weight of a $C_4$–$C_{20}$, saturated, straight chain, aliphatic dicarboxylic acid and about 10 to about 2 percent by equivalent weight of a $C_{10}$–$C_{22}$, saturated, straight chain, aliphatic, monocarboxylic acid-exemplified by U.S. Pat. No. 3,730,980; (c) an epoxy-functional copolymer of monovinyl monomers and as crosslinking agent therefor a diphenol having a molecular weight in the range of about 110 to about 550 — exemplified by U.S. Pat. application Ser. No. 172,228 filed Aug. 16, 1971, now U.S. Pat. No. 3,752,870; (d) an epoxy-functional copolymer of monovinyl monomers and as crosslinking agent therefor a carboxy terminated polymer-exemplified by U.S. Pat. application Ser. No. 172,229 filed Aug. 16, 1971, now U.S. Pat. No. 3,781,380; (e) an epoxy-functional copolymer of monovinyl monomers and as crosslinking agent a phenolic hydroxy terminated polymer — exemplified by U.S. Pat. application Ser. No. 172,225 filed Aug. 16, 1971, now U.S. Pat. No. 3,787,520; (f) an epoxy-functional, carboxyfunctional, self-crosslinkable copolymer of ethylenically unsaturated monomers — exemplified by U.S. Pat. application Ser. No. 172,238 filed Aug. 16, 1971, now U.S. Pat. No. 3,770,848; (g) a hydroxy-functional, carboxy-functional copolymer of monoethylenically unsaturated monomers — exemplified by U.S. Pat. application Ser. No. 172,237 filed Aug. 16, 1971, now U.S. Pat. No. 3,787,340; (h) an epoxy-functional copolymer of monovinyl monomers and as crosslinking agent therefor an anhydride of a dicarboxylic acid — exemplified by U.S. Pat. application Ser. No. 172,224 filed Aug. 16, 1971, now U.S. Pat. No. 3,781,379; (i) a hydroxy-functional copolymer of monoethylenically unsaturated monomers and as crosslinking agent therefor a compound selected from dicarboxylic acids, melamines, and anhydrides — exemplified by U.S. Pat. application Ser. No. 172,223 filed Aug. 16, 1971, and abandoned in favor of continuation application Ser. No. 406,128 filed Oct. 17, 1973 in turn abandoned in favor of continuation-in-part application Ser. No. 526,547 filed Nov. 25, 1974; (j) an epoxy-functional copolymer of monovinyl monomers and as crosslinking agent therefor a compound containing tertiary nitrogen atoms — exemplified by U.S. Pat. application Ser. No. 172,222 filed Aug. 16, 1971, now U.S. Pat. No. 3,758,635; (k) a copolymer of an alpha-beta unsaturated carboxylic acid and an ethylenically unsaturated compound and as crosslinking agent therefor an epoxy resin having two or more epoxy groups per molecule — as exemplified by U.S. Pat. application Ser. No. 172,226 filed Aug. 16, 1971, now U.S. Pat. No. 3,758,633; (l) a self-crosslinkable, epoxy-functional anhydride-functional copolymer of olefinically unsaturated monomers — exemplified by U.S. Pat. application Ser. No. 172,235 filed Aug. 16, 1971, now U.S. Pat. No. 3,758,632; (m) an epoxy-functional copolymer of monovinyl monomers and as crosslinking agent therefor a carboxy terminated polymer, e.g., a carboxy terminated polymer, e.g., a carboxy terminated polyester, — exemplified by application Ser. No. 223,746 filed Feb. 4, 1972, and abandoned in favor of continuation-in-part application Ser. No. 489,271 filed Aug. 5, 1974; (n) an epoxy-functional copolymer of vinyl monomers and as crosslinking agent therefor a dicarboxylic acid — exemplified by U.S. Pat. application Ser. No. 228,262 filed Feb. 22, 1972, now U.S. Pat. No. 3,787,521; (o) an epoxy-functional and hydroxy-functional copolymer of monovinyl monomers and as crosslinking agent therefor a $C_4 - C_{20}$, saturated, straight chain, aliphatic dicarboxylic acid — exemplified by U.S. Pat. application Ser. No. 394,874 filed Sept. 6, 1973 and now abandoned in favor of continuation-in-part application Ser. No. 552,676 filed Feb. 24, 1975; (p) an epoxy-functional copolymer of monovinyl monomers with optional hydroxy and/or amide functionality and as crosslinking agent therefore (1) a $C_4 - C_{20}$, saturated, straight chain, aliphatic dicarboxylic acid and (2) a polyanhydride — exemplified by U.S. Pat. application Ser. No. 344,881 filed Sept. 6, 1973 and now abandoned in favor of continuation-in-part application Ser. No. 552,556 filed Feb. 24, 1975 and continuation-in-part Ser. No. 552,557 filed Feb. 24, 1975; (q) an epoxy-functional amide-functional copolymer of monovinyl monomers and as crosslinking agent therefor an anhydride of a dicarboxylic acid exemplified by U.S. Pat. application Ser. No. 394,880 filed Sept. 6, 1973 and now abandoned in favor of continuation-in-part application Ser. No. 552,572 filed Feb. 24, 1975; (r) an epoxy-functional, hydroxy-functional copolymer of monovinyl monomers and as crosslinking agent therefore an anhydride of a dicarboxylic acid — exemplified by U.S. Pat. application Ser. No. 394,879 filed Sept. 6, 1973 and now abandoned in favor of continuation-in-part application Ser. No. 552,511 filed Feb. 24, 1975; (s) an epoxy-functional, amide-functional copolymer of monovinyl monomers and as crosslinking agent therefore a carboxy-terminated polymer — exemplified by U.S. Pat. application Ser. No. 394,875 filed Sept. 6, 1973 and now abandoned in favor of continuation-in-part application Ser. No. 552,518 filed Feb. 24, 1975; (t) an epoxy-functional copolymer of monovinyl monomers and as crosslinking agent therefore a monomeric or polymeric anhydride and a hydroxy carboxylic acid — exemplified by U.S. patent application Ser. No. 394,878 filed Sept. 6, 1973 and now abandoned in favor of continuation-in-part application Ser. No. 552,079 filed Feb. 24, 1975; (u) an epoxy-functional, amide-functional copolymer of monovinyl monomers and as crosslinking agent therefore a monomeric or polymeric anhydride and a hydroxy carboxylic acid — exemplified by U.S. Pat. application Ser. No. 394,877 filed Sept. 6, 1973 and now abandoned in favor of continuation-in-part application Ser. No. 552,077 filed Feb. 24, 1975; and (v) an epoxy-functional, hydroxy-functional copolymer of monovinyl monomers and as crosslinking agent therefore a monomeric or polymeric anhydride and a hydroxy carboxylic acid — exemplified in U.S. Pat. application Ser. No. 394,876 filed Sept. 6, 1973.

The disclosures of the aforementioned patents and patent applications are incorporated herein by reference.

Other thermoset film-formers suitable for use in coating the metal particles include, but not by way of limitation thermosettable systems in which the polymeric component is a polyester, a polyepoxide and urethane-modified polyesters, polyepoxides and acrylics. As with the acrylics heretofore more specifically described, these may be self-crosslinking polymers or may be a combination of functional polymer and a coreactable monomeric compound which serves as crosslinking agent.

The preferred thermosettable powder paints known to applicants for automotive topcoats, the use wherein metallic pigments find their greatest use, consist essentially of an epoxy-functional copolymer of olefinically unsaturated monomers and a crosslinking agent therefor. Such paints, exclusive of pigments, may also contain flow control agents, catalysts, etc. in very small quantities.

The copolymer referred to in the preceding paragraph has average molecular weight ($M_n$) in the range of about 1500 to about 15,000 and glass transition temperature in the range of about 40°C. to about 90°C. The epoxy functionality is provided by employing a glycidyl ester of a monoethylenically unsaturated carboxylic acid, e.g., glycidyl acrylate or glycidyl methacrylate, as a constituent monomer of the copolymer. This monomer should comprise about 5 to about 20 weight percent of the total. Additional functionality, e.g., hydroxy functionality or amide functionality, may also be employed by inclusion of a $C_5 - C_7$ hydroxy acrylate or methacrylate, e.g., hydroxyethyl acrylate, hydroxyethyl methacrylate, hydroxypropyl acrylate, or hydroxypropyl methacrylate, or an alpha-beta olefinically unsaturated amide, e.g., acrylamide or methacrylamide, among the constituent monomers. When such additional functionality is used, the monomers providing it comprise about 2 to about 10 weight percent of the constituent monomers. The balance of the copolymer, i.e., about 70 to about 93 weight percent of the constituent monomers, are made up of monofunctional, olefinically unsaturated monomers, i.e., the sole functionality being ethylenic unsaturation. These monofunctional, olefinically unsaturated monomers are, at least in major proportion, i.e., in excess of 50 weight percent of the constituent monomers, acrylic monomers. The preferred monofunctional acrylic monomers for this purpose are esters of $C_1 - C_8$ monohydric alcohols and acrylic or methacrylic acid, e.g., methyl methacrylate, ethyl acrylate, propyl methacrylate, butyl acrylate, butyl methacrylate, hexyl acrylate and 2-ethylhexyl acrylate. In this preferred embodiment, the remainder, if any, aside from the aforementioned epoxy, hydroxy and amide functional monomers which also have olefinic unsaturation functionality used up in the polymerization formation of the copolymer, is preferably made up to $C_8 - C_{12}$ monovinyl hydrocarbons, e.g., styrene, vinyl toluene, alpha methyl styrene and tertiary butyl styrene. Other vinyl monomers which are suitable in minor amounts, i.e., between 0 and 30 weight percent of the constituent monomers, include vinyl chloride, acrylonitrile, methacrylonitrile, and vinyl acetate.

The crosslinking agents employed with the aforedescribed copolymer will have functionality that will react with the functionality of the copolymer. Thus, all of the crosslinking agents heretofore mentioned in the recital of powder paint patents and patent applications, e.g., $C_4 - C_{20}$ saturated, aliphatic dicarboxylic acids, mixtures of $C_4 - C_{20}$ saturated aliphatic dicarboxylic acids and monocarboxylic acids of carbon number in the same range, carboxy terminated copolymers having molecular weight ($\overline{M}_n$) in the range of 650 to 3000, monomeric anhydrides preferably anhydrides having a melting point in the range of about 35° to 140°C., e.g., phthalic anhydride, maleic anhydride, cyclohexane-1,2-dicarboxylic anhydride, succinic anhydride, etc., homopolymers of monomeric anhydrides, and mixtures of such anhydrides and hydroxy acids having a melting point in the range 40° to 150°C., are suitable for use as crosslinking agents for these copolymers. The disclosures of all patents and patent applications recited herein are incorporated herein by reference. In general, these crosslinking agents are employed in amounts such as to provide between about 0.3 and about 1.5, preferably between about 0.8 and about 1.2, functional groups which are reactable with functional groups on the copolymer per functional group on the copolymer.

The term "vinyl monomer" as used herein means a monomeric compound having in its molecular structure the functional group

wherein X is a hydrogen atom or a methyl group.

"Alpha-beta unsaturation" as used herein includes both the olefinic unsaturation that is between two carbon atoms which are in the alpha and beta positions relative to an activating group such as a carboxyl group, e.g., the olefinic unsaturation of maleic anhydride, and the olefinic unsaturation between the two carbon atoms which are in the alpha and beta positions with respect to the terminus of an aliphatic carbon-to-carbon chain, e.g., the olefinic unsaturation of acrylic acid or styrene.

DETAILED DESCRIPTION OF THE INVENTION

The preparation of the coated metal flakes is carried out in a solvent for the film-former that is sufficiently volatile for efficient spray drying and which will not chemically react with either the film-former or the metal flakes to a degree that will significantly modify their properties or appearance within the contact times employed to carry out the spray drying process. A preferred solvent for this purpose is methylene chloride. Other solvents which can be used include toluene, xylene, methyl ethyl ketone, methanol, acetone and low boiling napthas.

A typical formulation for a feed stock for the spray drier in accordance with this invention would include the following:

|  | Parts by Weight |
|---|---|
| aluminum paste (65% Al) | 30.00 |
| film-former | 11.00 |
| MeCl$_2$ | 200.00 |

Typical operating parameters for a conventional, 3 ft. diameter spray drier equipped with a conventional two-fluid nozzle atomizer, e.g., a gas and a liquid as in a conventional air-atomizing, liquid-paint, spray gun, are as follows:

| air flow | 197 cubic feet/minute |
|---|---|
| feed flow | 380 ml/minute |
| inlet air temperature | 180°F. |
| outlet air temperature | 80°F. |
| product rate | 6 lbs./hr. |

The coated aluminum, as received from the spray drier, is then sieved through a screen of desired particle size, e.g., a 44 micron screen, to remove excessively large particles. Approximately 20% of the product in the form of oversize particles is discarded.

The non-metal powder component, hereinafter called the "powder component" comprises the primary film-forming component and, where the finish is to be polychromatic, at least one nonmetal color producing component. This non-metal color produring component may be a particulate pigment, dye or tint. For purposes of this invention, white and black shall be considered colors inasmuch as a light reflecting or light absorbing material must be added to the organic film-former to provide the finish with a white or black appearance in the same manner that a material must be added to the organic film-former to reflect light rays that convey to the eye one color while absorbing others.

The formulation of the non-metal powder component, which in the case of a polychromatic finish contains a non-metal color producing component, is prepared taking into consideration the particular color chosen for employment with the metallic color component and the amount of the metallic color component to be employed. The powder component is quantitatively formulated taking into account the amount of material to be brought in through the addition of the coated metal particles.

A typical composition for the powder component is as follows:

|  | Parts by Weight |
|---|---|
| film-former | 94.33 |
| flow control additive | 0.67 |
| pigment | 5.00 |

The preparation and processing of the non-metal powder component into powder form is carried out by one of the conventional powder preparation techniques, e.g., extrusion, spray drying, or solvent extraction. Once in powder form, this material is sieved through a suitable screen, e.g., a 74 micron screen.

The final step in the preparation of the powder coating material of this invention is the blending of the two major components, i.e., the metal component consisting of encapsulated aluminum flakes and nickel powder and the non-metal powder component. The exact proportions of the two major components will, of course, depend on the specific formulation and the amount of metal needed. In the typical example aforedescribed, if one blends about 98.5 parts by weight of the non-metal powder component with about 1.5 parts by weight of the coated aluminum, a "low metallic" automotive topcoat paint results.

Appearance of the finished coating will, of course, be a primary factor in selecting the total concentration of metal in the total powder paint composition. This concentration will vary from a very low weight percent of the total powder paint composition in some polychromatic finishes, i.e., as low as about 0.005 weight percent, to a much higher weight percent of the total powder paint composition in the so called "Argent" finishes, i.e., as high as about 25 weight percent when aluminum is the only metal used. If for example, the spray dried coating on the flakes comprises about 2 to about 30 weight percent by weight of the flakes then, the total metal component of the powder paint composition will comprise between about 0.005 to about 32.50, advantageously between about 0.25 to about 28.75, and preferably between about 0.54 to about 28.25, weight percent of the total powder paint composition. These figures will be modified by the weight of nickel powder substituted for a portion of the aluminum. The principal film-forming powder and non-metal pigment, if any, will make up the balance of the powder paint composition. The non-metal pigment will constitute between 0 and 22 weight percent of the total composition.

This invention will be more fully understood from the following illustrative examples.

EXAMPLE 1 a. Preparation of the Coated Aluminum Flakes

A thermoplastic coating material for coating aluminum flake is prepared from the following materials using the procedure hereinafter outlined:

|  | Parts By Weight |
|---|---|
| poly (methyl methacrylate) $\overline{M}_n = 15,000$ | 100 |
| poly (lauryl methacrylate) $\overline{M}_n = 10,000$ | 2 |

The above ingredients are mixed together in a twin shell tumbling mixer for 10 minutes and then mill rolled at 190°C. for 15 minutes. The blend is cooled and pulverized to pass through a 200 mesh screen.

Two (2) parts by weight of this thermoplastic mixture are combined with 30 parts by weight of aluminum paste (35% by weight mineral spirits and 65% by weight aluminum flakes that will pass through a 325 mesh screen and have typical surface area of 7.5 m²/gram, maximum particle diameter below 45 microns and most common particle size distribution in the range of about 7 to about 15 microns) and 200 parts by weight of methylene chloride under low shear agitation so as to disperse the aluminum in the thermoplastic material without damage to the aluminum flakes.

Once the above dispersion has been prepared, it is spray dried in a manner which produces individual aluminum flakes coated with a thin, continuous coating of dry polymers. This is accomplished in a 3 foot diameter spray drier equipped with a two-fluid nozzle in counter-current position using the following conditions:

| air flow in drying chamber | 200 cubic feet |
|---|---|
| feed rate of mixture | 380 ml/minute |
| inlet air temperature | 180°F. |
| two fluid atomization air pressure | 80 lbs. |

The product obtained from this process has an overall composition of about 19.5 parts by weight of aluminum, about 2.0 parts by weight of the thermoplastic mixture above described in this example, and a small amount of residual solvent, i.e., 0.05 to 0.2 parts, that has not volatilized during the spray dry process. This product is then screened through a 44 micron screen.

b. Preparation of the Non-Metal Powder Component

A thermoplastic powder paint is prepared from the following materials using the procedure and materials hereinafter described:

|  | Parts By Weight |
|---|---|
| poly (methyl methacrylate) $\overline{M}_n = 40,000$ | 100 |
| poly (lauryl methacrylate) $\overline{M}_n = 120,000$ | 2 |
| tetrabutylammonium bromide | 0.5 |

The above ingredients are mixed in a twin shell tumbling mixer for 10 minutes and then mill rolled at 190°C. for 15 minutes. The blend is cooled and pulverized to pass through a 200 mesh screen.

The non-metal powder component of the powder coating composition is prepared by mixing 188 parts by weight of this thermoplastic material with the following materials:

|  | Parts By Weight |
|---|---|
| poly (lauryl acrylate) $\overline{M}_n = 10,000$ | 1.34 |
| phthalo green pigment | 2.77 |
| yellow iron oxide pigment | 7.24 |

A homogeneous mixture of the above is obtained by ball milling for 2 hours. This mixture is then extruded at 100°C. from a kneading extruder. The solid thus obtained is pulverized in an impact mill, i.e., an air classified impact mill, and sieved through a 200 mesh screen.

c. Preparation of the Powder Coating Material

A powder coating material in accordance with this invention is produced by mixing 0.55 part by weight of the coated aluminum flakes from (a) and 1.0 parts by weight of nickel powder (325 mesh) with 98.35 parts by weight of the non-metal powder component. A homogeneous mixture of the two components is obtained by rapidly tumbling the material in a partially filled container for 20 minutes under ambient room conditions, i.e., about 65° to 75°F. In preparing the powder by this method, it will be obvious to those skilled in the art that actual mixing times will vary somewhat with the size of the container and the mechanical action.

The powder thus obtained is then sprayed on an electrically grounded steel substrate with a conventional electrostatic powder spray gun operating at about 50 KV charging voltage. After spraying, the coated substrate is heated to about 392°F. for about 20 minutes. The coating thus obtained has good appearance and physical properties. The coating thus obtained demonstrates a more random metal particle orientation with respect to depth and increased polychromatic light reflection of the cured film than is obtained when this process is duplicated except for substituting an equal volume of aluminum flakes of like size for the nickel powder.

EXAMPLE 2

The procedure of Example 1 is repeated except for the difference that the weight ratio of nickel powder to coated aluminum flake is 1:4. The coating thus obtained has good appearance, good physical properties, and a random metal particle orientation with respect to depth. With the change in ratio, there is, of course, a change in polychromatic appearance. This flexibility is advantageous in preparing a variety of market-acceptable, polychromatic coatings with the same or different non-metal pigments.

EXAMPLE 3

The procedure of Example 1 is repeated except for the difference that the weight ratio of nickel powder to coated aluminum flake is 5:1. The coating thus obtained has good appearance, good physical properties, and a random metal particle orientation with respect to depth. This flexibility is advantageous in preparing a variety of market-acceptable, polychromatic coatings with the same or different non-metal pigments.

EXAMPLE 4

The procedure of Example 1 is repeated except for the difference that the weight ratio of nickel powder to coated aluminum flake is 1.5:1. A coating of outstanding appearance is obtained and the physical properties of the film are good.

EXAMPLE 5

The procedure of Example 1 is repeated except for the difference that the weight ratio of nickel powder to coated aluminum flake is 2.5:1. A coating of outstanding appearance is obtained and the physical properties of the film are good.

EXAMPLE 6

A powder coating material is prepared following the procedure of Example 1 with the following differences: (1) the coated aluminum flakes are prepared from the following materials:

| | Parts by Weight |
|---|---|
| aluminum paste | 30.000 |
| (65% aluminum flakes and 35% mineral spirits) | |
| thermoplastic mixture | 0.218 |
| (a) poly (methyl methacrylate - 100 $\overline{M}_n = 12,000$ and | |
| (b) poly (lauryl methacrylate - 2 $\overline{M}_n = 9,000$ | |
| poly (butyl acrylate) $\overline{M}_n = 10,000$ | 0.001 |
| methylene chloride | 197.000 |

The product obtained after spray drying has a composition of 19.50 parts by weight aluminum, 0.218 parts by weight of the thermoplastic mixture and 0.001 parts by weight poly (lauryl acrylate).

The coated aluminum thus produced in the amount of 0.52 parts by weight and 1.0 parts by weight of 325 mesh nickel powder are combined with 98.48 parts by weight of the non-metal powder component of Example 1.

This powder coating material is electrodeposited upon a metal substrate and heat cured as in Example 1. The resulting coating demonstrates good gloss, good orientation of the aluminum flakes, good depth variation of the metal particles, and weathering resistance.

EXAMPLE 7

A powder coating material is prepared following the procedure of Example 1 with the following differences:
1. The starting mixture for preparation of the coated aluminum flakes is of the following composition:

| | Parts By Weight |
|---|---|
| aluminum paste | 30.0 |
| (65% by weight aluminum and 35% by weight mineral spirits | |
| thermoplastic mixture | 5.46 |
| (a) poly (methyl methacrylate) 100 $\overline{M}_n = 12,000$ and | |
| (b) poly (lauryl methacrylate 2 $\overline{M}_n = 9,000$ | |
| poly (butyl acrylate) $\overline{M}_n = 9,000$ | 0.03 |
| methylene chloride | 250.00 |

This material is mixed and spray dried as in Example 1 and in the resultant material the flakes have coating about 2.5 times thicker than that of the coated flakes of Example 1. The empirical composition of the spray dried product by weight is as follows:

| | Parts By Weight |
|---|---|
| aluminum (dry) | 19.5 |
| thermoplastic coating | 5.49 |

2. Since the amount of coating on the aluminum flakes is here large enough to be a significant factor, it is taken into consideration when formulating the non-metal powder component and this component is adjusted to keep the pigment concentration essentially the same as that in Example 1.

3. The weight ratio of the nickel powder to coated aluminum flakes in this example is 2.1:1.

The coating obtained from this material has good appearance and good metal particle orientation and depth variation.

EXAMPLE 8

The procedure of Example 1 is repeated except for the differences:
1. the coating of the aluminum flakes is prepared from 30 parts by weight of the same aluminum paste used in Example 1 (19.5 parts by weight aluminum), 4.7 parts by weight of the thermoplastic material of Example 1 and 0.03 parts by weight poly (lauryl acrylate), (2) Following the procedure of Example 7, the non-metal powder component is adjusted and employed in an amount to provide the powder coating material to be sprayed with the same level of pigment loading as in such material in Example 1. (3) the weight

15 ratio of nickel powder to coated aluminum flakes is 1.8:1.

The cured finish obtained has good physical properties and good depth variation in metal pigment positioning.

EXAMPLE 9

The procedure of Example 1 is repeated except for the differences:

1. The coating of theaaluminum flakes is prepared from 30 parts by weight of aluminum paste used in Example 1 (19.5 parts by weight aluminum), 2.93 parts by weight of the thermoplastic material of Example 1, and 0.02 parts by weight poly (lauryl acrylate), (2) Following the procedure of Example 7, the non-metal powder component is adjusted and employed in an amount to provide the powder coating material to be sprayed with the same level of pigment loading as in such material in Example 1, and (3) the weight ratio of nickel powder to coated aluminum flakes is 1:2.

The cured finish obtained has good physical properties and good depth variation in metal pigment positioning.

EXAMPLE 10

The procedure of Example 1 is repeated except for the following differences:

1. The coating of the aluminum flakes is prepared from 30 parts by weight of the aluminum paste used in Example 1 (19.5 parts by weight aluminum) and 1.76 parts by weight of the thermoplastic material of Example 1 and 0.01 parts by weight poly (lauryl acrylate) $\overline{M}_n = 10,000$, and (2) the weight ratio of nickel powder to coated aluminum flakes is 1:1.

The cured finish obtained has good physical properties and good depth variation in metal pigment positioning.

EXAMPLE 11

The procedure of Example 1 is repeated except for the following differences:

1. The coating of the aluminum flakes is prepared from 30 parts by weight of the aluminum paste used in Example 1 (19.5 parts by weight aluminum) and 2.54 parts by weight of the thermoplastic material of Example 1, and 0.01 parts by weight poly (lauryl acrylate)- $\overline{M}_n = 10,000$, (2) Following the procedure of Example 7, the non-metal powder component is adjusted and employed in an amount to provide the powder coating material to be sprayed with the same level of pigment loading as in such material in Example 1 and (3) the weight ratio of nickel powder to coated aluminum flakes is 1:3.

The cured finish obtained has good physical properties and good depth variation in metal pigment positioning.

EXAMPLE 12

The procedure of Example 1 is repeated except for the following differences:

1. The coating of the aluminum flakes is prepared from 30 parts by weight of the aluminum paste used in Example 1 (19.5 parts by weight aluminum) and 0.39 parts by weight of the thermoplastic material of Example 1, and 0.002 parts by weight poly (lauryl acrylate) - $\overline{M}_n = 10,000$, and (2) the weight ratio of nickel powder to coated aluminum flakes is 1:2.

The cured finish obtained has good physical properties and good depth variation in metal pigment positioning.

EXAMPLE 13

The procedure of Example 1 is repeated except for the differences:

1. The coating of the aluminum flakes is prepared from 30 parts by weight aluminum paste used in Example 1 (19.5 parts by weight aluminum) and 0.98 parts by weight of the thermoplastic coating material used for coating in Example 1.

2. Following the procedure of Example 7, the non-metal powder component is adjusted and employed in an amount to provide the powder coating material to be sprayed with the same level of pigment loading as in such material in Example 1, and (3). The weight ratio of nickel powder to coated aluminum flakes is 1.7:1.

The cured finish obtained has good physical properties and good depth variation in metal pigment position.

EXAMPLE 14

The procedure of Example 1 is repeated except for the difference that the non-metal powder component (b) is prepared by the same procedure but with different materials. Here, the thermoplastic film-former is made up of the following materials:

|  | Parts by Weight |
|---|---|
| poly (methyl methacrylate) $\overline{M}_n = 60,000$ | 100 |
| poly (tridecyl methacrylate) $\overline{M}_n = 80,000$ | 4 |
| tribenzylammonium chloride | 0.2 |

EXAMPLE 15

The procedure of Example 1 is repeated except for the differences that the film former for coating the aluminum flake in (a) is prepared by the same procedure but with different materials and the non-metal powder component (b) is prepared by the same procedure but with different materials: The film-former used to coat the aluminum flakes (a) in this example is made up of a mixture of:

|  | Parts by Weight |
|---|---|
| poly (methyl methacrylate) $\overline{M}_n = 10,000$ | 100 |
| poly (butyl methacrylate) $\overline{M}_n = 15,000$ | 6 |

The film-former of the non-metal powder component (b) in this example is made up of a mixture of:

|  | Parts by Weight |
|---|---|
| poly (methyl methacrylate) $\overline{M}_n = 80,000$ | 100 |
| poly (butyl methacrylate) $\overline{M}_n = 100,000$ | 6 |
| Stearyldimethyl benzyl-ammonium chloride | 0.6 |

EXAMPLE 16

The procedure of Example 1 is repeated except for the difference that the thermoplastic film-former of the nonmetal powder component (b) is prepared by the same procedure but with different materials. Here, the thermoplastic film-former is made up of the following materials:

| | Parts by Weight |
|---|---|
| acrylate copolymer ($\overline{M}_n = 15,000$ (75 parts methyl methacrylate and 25 parts butyl methacrylate) | 100 |
| poly (2-ethylhexyl acrylate) $\overline{M}_n = 10,000$ | 0.8 |
| tetraethyl ammonium bromide | 0.3 |

EXAMPLE 17

The procedure of Example 16 is repeated with the sole exception that the copolymer of 75 parts methyl methacrylate and 25 parts butyl methacrylate is replaced with an equal amount of a copolymer of 60 parts methyl methacrylate and 40 parts butyl methacrylate ($\overline{M}_n = 80,000$).

EXAMPLE 18

The procedure of Example 16 is repeated with the sole exception that the copolymer of 75 parts methyl methacrylate and 25 parts butyl methacrylate is replaced with an equal amount of a copolymer of 80 parts methyl methacrylate and 20 parts ethyl acrylate ($\overline{M}_n = 80,000$).

EXAMPLE 19

The procedure of Example 16 is repeated with the sole exception that the copolymer of 75 parts methyl methacrylate and 25 parts butyl methacrylate is replaced with an equal amount of a copolymer of 85 parts styrene and 15 parts butyl acrylate.

EXAMPLE 20

The procedure of Example 1 is repeated with the difference that the thermoplastic film-former of the non-metal powder component (b) is prepared by the same procedure but with different materials. Here, the thermoplastic film-former is made up of the following materials:

| | Parts by Weight |
|---|---|
| acrylate copolymer — $\overline{M}_n = 40,000$ (a copolymer of 98 parts methyl methacrylate and 2 parts of glycidyl methacrylate) | 100 |
| polybutyl acrylate $\overline{M}_n = 50,000$ | 0.8 |
| triethylene diamine | 0.2 |

EXAMPLE 21

The procedure of Example 1 is repeated with the difference that the film-former of the non-metal powder component (b) is thermosettable and is prepared using the materials and procedures hereinafter set forth.

An epoxy-functional acrylic copolymer of vinyl monomers is prepared as follows:

| Ingredients | Parts by Weight |
|---|---|
| glycidyl methacrylate | 15 |
| methyl methacrylate | 45 |
| butyl methacrylate | 40 |

The above named ingredients are mixed together. Three (3) parts by weight of 2,2′ - azobis - (2-methyl-propionitrile), hereinafter called AIBN, is dissolved in the monomer mixture. The mixture is slowly added to refluxing toluene (100 parts) which is stirred vigorously under a nitrogen atmosphere. A condenser is provided at the top of the toluene container to condense the toluene vapors and return them to the container. The monomer mixture is added through a regulating valve and the rate of addition is controlled to maintain a reflux temperature (109°C. – 112°C.) with only a small fraction of heat supplied from an external heater. After the addition of the monomer mixture is complete, the refluxing is maintained by external heat source for 3 additional hours.

The solution is poured into shallow stainless steel trays. These trays are placed in a vacuum oven and the solvent evaporated therefrom. As the solvent is removed, the copolymer solution becomes more concentrated. The temperature of the vacuum oven is raised to about 110°C. Drying is continued until the solvent content of the copolymer is below 3 percent. The trays are cooled and the copolymer collected and ground to pass through a 20 mesh screen. The copolymer has a glass transition temperature of 53°C. and a molecular weight ($\overline{M}_n$) of 4,000.

One hundred parts by weight of the ground copolymer are mixed with the following materials:

| | Parts by Weight |
|---|---|
| azelaic acid | 10.0 |
| tetrabutyl ammonium bromide | 0.2 |
| poly (lauryl acrylate) ($\overline{M}_n = 10,000$) | 0.5 |

The materials are mixed together in a ball mill for 2 hours. The mixture is mill rolled at 85°C. to 90°C. for 5 minutes. The solid obtained is ground in a ball mill and the powder is sieved with a 140 mesh screen.

EXAMPLE 22

The procedure of Example 21 is repeated with the difference that the film-former of the non-metal powder component is prepared as in Example 21 using 166 parts by weight of the ground epoxy-functional copolymer of Example 21, 22.64 parts by weight of azelaic acid and 1.33 poly (lauryl acrylate) - $\overline{M}_n = 10,000$.

EXAMPLE 23

The procedure of Example 1 is repeated except for the difference that the non-metal powder component is an epoxy-functional and hydroxy-functional copolymer of vinyl monomers prepared as follows:

| Reactants | Grams | Percent by Weight Of Total Reactants |
|---|---|---|
| glycidyl methacrylate | 225.0 | 15 |
| hydroxyethyl methacrylate | 75.0 | 5 |
| butyl methacrylate | 600.0 | 40 |
| styrene | 75.0 | 5 |
| methyl methacrylate | 525.0 | 35 |

The above mentioned monomers are admixed in the proportions above set forth and 70.0 grams (4.5% based on combined weights of reactants) of 2,2′-azobis-(2-methyl propionitrile), hereinafter called AIBN, are added to the monomer mixture. The solution is added dropwise over a 3 hour period into 1500 ml. toluene at 100° – 108°C. under nitrogen atmosphere. Then 0.4 grams of AIBN dissolved in 10 ml. of acetone are added over a ½ hour period and refluxing is cdontinued for 2 additional hours.

The toluene-polymer solution is diluted in 1500 ml. acetone and coagulated in 16 liters of hexane. The white powder is dried in a vacuum oven at 55°C. for 24 hours. This copolymer has molecular weight - $M_w/M_n$ = 6750/3400 and the molecular weight per epoxy group is about 1068.

A thermosettable material is produced by mixing 166 parts of the epoxy-functional, hydroxy-functional copolymer with 22.65 parts by weight of azelaic acid, and 1.34 parts by weight of poly (lauryl acrylate - $\overline{M}_n$ = 10,000).

A homogeneous mixture of the above is obtained by ball milling for 2 hours. This mixture is then extruded at 100°C. from a kneading extruder. The solid thus obtained is pulverized in an impact mill, i.e., an air classified impact mill, and sieved through a 200 mesh screen.

EXAMPLE 24

The procedure of Example 23 is repeated except for the difference that a functionally equivalent amount of poly (azelaic anhydride) is substituted for the azelaic acid.

EXAMPLE 25

The procedure of Example 24 is repeated except for the difference that about 35% of the poly (azelaic anhydride) is replaced with a functionally equivalent amount of 12-hydroxystearic acid.

EXAMPLE 26

The procedure of Example 24 is repeated with the following differences:

1. The epoxy-functional, hydroxy-functional copolymer is replaced with an epoxy-functional, amide-functional copolymer prepared from the below listed components in the manner hereinafter described:

| Reactants | Grams | Percent By Weight Of Total Reactants |
|---|---|---|
| glycidyl methacrylate | 45 | 15 |
| acrylamide | 15 | 5 |
| butyl methacrylate | 111 | 37 |
| methyl methacrylate | 129 | 43 |

The above mentioned monomers are admixed in the proportions above set forth and 11.0 grams of 2,2' - azobis - (2-methylpropionitrile), hereinafter called AIBN, are added to the mixture. The mixture is slowly added to 200 ml. of toluene heated to 80° – 90°C. which is being stirred vigorously under a nitrogen atmosphere. A condenser is provided at the top of the toluene container to condense the toluene vapors and return the condensed toluene to the container. The monomer mixture is added through a regulating valve and the rate of addition is controlled to maintain a reaction temperature of 90° – 110°C. with the rest of the heat supplied from an external heater. After the addition of the monomer mixture is completed (3 hours), 0.8 grams of AIBN dissolved in 10 ml. acetone is added over a one-half (½) hour period and refluxing is continued for two (2) additional hours.

The resultant toluene-polymer solution is diluted with 200 mls. acetone and coagulated in 2 liters of hexane. The white powder is dried in the vacuum oven at 55°C. for 24 hours. Its molecular weight is determined to be $M_w/M_n$ = 6700/3200 and WPE (molecular weight per epoxide group) is about 1000. (2) The azelaic acid is replaced with a functionally-equivalent amount of carboxy-terminated polymer crosslinking agent. This crosslinking agent is prepared in the following manner: Five hundred grams of a commercially available epoxy resin, Epon 1001, (epoxide equivalent 450–525, melting range 64° – 76°C. and molecular weight average 900°C.), is charged into a 500 ml. stainless steel beaker having a heating mantle. The epoxy resin is heated to 110°C. As the epoxy resin is stirred, 194 grams of azelaic acid is added. After a reaction time of 30 minutes, a homogeneous mixture is obtained. The mixture resin, only semi-reacted, is poured out into an aluminum pan and cooled. The solid mixture is pulverized to pass through a 100 mesh screen by use of a blender. The mixture resin is only semi-reacted because if fully reacted it could not be powdered.

EXAMPLE 27

The procedure of Example 1 is repeated except for the difference that the poly (lauryl acrylate - $\overline{M}_n$ = 10,000) is replaced with an equivalent amount of polyethylenne glycol perfluro octonoate ($\overline{M}_n$ = 3400).

EXAMPLE 28

The procedure of Example 1 is repeated except for the difference that the poly (lauryl acrylate) is replaced with an equivalent amount of poly (butyl acrylate) - $\overline{M}_n$ = 9000.

EXAMPLE 29

The procedure of Example 1 is repeated except for the difference that the poly (lauryl acrylate) is replaced with an equivalent amount of poly (isododecyl methacrylate).

EXAMPLE 30

The procedure of Example 1 is repeated except for the difference that the coated aluminum flakes and the nickel powder are mixed with the principal film-forming powder in an amount such as to provide a metal pigment component which commprises 0.1 weight percent of the total powder paint composition and the weight ratio of nickel powder to coated aluminum flakes is 1.75:1.

EXAMPLE 31

The procedure of Example 1 is repeated except for the difference that the coated aluminum flakes and the nickel powder are mixed with the principal film-forming powder in an amount such as to provide a metal pigment component which comprises 32.50 weight percent of the total powder paint composition and the weight ratio of nickel powder to coated aluminum flakes is 2.25:1.

EXAMPLE 32

The procedure of Example 1 is repeated except for the difference that the coated aluminum flakes and the nickel powder are mixed with the principal film-forming powder in an amount such as to provide a metal pigment component which comprises 0.25 weight percent of the total powder paint composition and the weight ratio of nickel powder to coated aluminum flakes is 1.5:1.

EXAMPLE 33

The procedure of Example 1 is repeated except for the difference that the coated aluminum flakes and the nickel powder are mixed with the principal film-forming powder in an amount such as to provide a metal pigment component which comprises 28.75 weight percent of the total powder paint composition and the weight ratio of nickel powder to coated aluminum flakes is 2.5:1. In this example, non-metal pigments are not used.

EXAMPLE 34

The procedure of Example 1 is repeated except for the difference that the coated aluminum flakes and the nickel powder are mixed with the princial film-forming powder in an amount such as to provide a metal pigment component which comprises 0.45 weight percent of the total powder paint composition and the weight ratio of nickel powder to coated aluminum flakes is 2:1.

EXAMPLE 35

The procedure of Example 1 is repeated except for the difference that the coated aluminum flakes and the nickel powder are mixed with the principal film-forming powder in an amount such as to provide a metal pigment component which comprises 10 weight percent of the total powder paint composition and the weight ratio of nickel powder to coated aluminum flakes is 2:1.

EXAMPLE 36

The procedure of Example 1 is repeated with the differences that the coated aluminum flakes and the nickel powder are mixed with the principal film-forming powder in an amount such as to provide a metal pigment component which comprises 1 weight percent of the total powder paint composition and the weight ratio of nickel powder to coated aluminum flakes is 2:1. In this example, the non-metal pigments constitute 21.9 weight percent of the total powder paint composition.

EXAMPLE 37

The procedure of Example 1 is repeated with the following compositional differences. The coated aluminum flakes and the nickel powder are mixed with the principal film-forming powder in an amount such that they provide a metal pigment component which comprises 31.0 weight percent of the total paint composition, the weight ratio of nickel powder to coated aluminum flakes is 2:1 and the principal film-forming powder contains, as the sole non-metal pigment, phthalo green pigment in an amount such that it comprises 0.25 weight percent of the total powder paint composition.

EXAMPLE 38

The procedure of Example 1 is repeated with the following compositional differences. The coated aluminum flakes and the nickel powder are mixed with the principal film-forming powder in an amount such that they comprise 0.5 weight percent of the total powder paint composition and the weight ratio of nickel powder to coated aluminum flakes is 2:1.

EXAMPLE 39

The procedure of Example 1 is repeated with the following compositional differences. The coated aluminum flakes and the nickel powder are mixed with the principal film-forming powder in an amount such that they comprise 4.0 weight percent of the total powder with a weight ratio of nickel powder to coated aluminum flakes is 2:1 and the principal film-forming powder contains a mixture of metal-free pigments in an amount such that it comprises 22 weight percent of the total powder paint composition. The mixture of metal-free pigments consists predominantly of chrome yellow with flaventhron (yellow organic), red iron oxide and carbon black present from trace amounts to above one weight percent.

EXAMPLE 40

The procedure of Example 1 is repeated except for the differences that the aluminum flakes are coated with polyacrylonitrile $\overline{M}_n = 15,000$ and such coating is in the amount of 5 percent by weight of the aluminum flakes.

EXAMPLE 41

The procedure of Example 1 is repeated except for the differences that the aluminum flakes are coated with polyhexamethylene adipamide - $\overline{M}_n = 5,000$, and such coating is in the amount of 3 percent by weight of the aluminum flakes.

EXAMPLE 42

The procedure of Example 1 is repeated except for the differences that the aluminum flakes are coated with cellulose butyrate - $\overline{M}_n = 10,000$, the solvent is methanol, and such coating is in the amount of 5 percent by weight of the aluminum flakes. The temperature of the spray drier is adjusted to compensate for the change of solvent.

EXAMPLE 43

The procedure of Example 1 is repeated except for the differences that the aluminum flakes are coated with a polyester, i.e., glycol phthalate - $\overline{M}_n = 5,000$, the solvent is acetone and such coating is in the amount of 10 percent by weight of the aluminum flakes. The temperature of the spray drier is adjusted to compensate for the change of solvent.

EXAMPLE 44

The procedure of Example 1 is repeated except for the differences that the aluminum flakes are coated with a styrenemethyl methacrylate copolymer - $\overline{M}_n = 15,000$, the solvent is acetone and such coating is in the amount of 13 percent by weight of the aluminum flakes. The temperature of the spray drier is adjusted to compensate for the change of solvent.

EXAMPLE 45

The procedure of Example 1 is repeated except for the differences that the aluminum flakes are coated with cellulose acetate - $\overline{M}_n = 15,000$, the solvent is methanol, and such coating is in the amount of 7 percent by weight of the aluminum flakes. The temperature of the spray drier is adjusted to compensate for the change of solvent.

EXAMPLE 46

The procedure of Example 1 is repeated except for the differences that the aluminum flakes are coated with polystyrene, the solvent is toluene and the coating is in the amount of 2.5 percent by weight of the aluminum flakes. The temperature of the spray drier is adjusted to compensate for the change of solvent.

EXAMPLE 47

The procedure of Example 1 is repeated except for the difference that a functionally equivalent amount of a hydroxy-functional copolymer is substituted for the epoxy-functional copolymer of Example 1 and a functionally equivalent amount of hexamethoxy melamine is substituted for the azelaic acid.

The hydroxy-functional copolymer used in this example is prepared from the below listed components in the manner hereinafter described:

| Reactants | Parts By Weight |
|---|---|
| 2-hydroxyethyl methacrylate | 15 |
| ethyl acrylate | 25 |
| methyl methacrylate | 60 |

A one liter, four-necked flask which contains 150 ml. of methyl ethyl ketone is heated until the contents of the flask are at a refluxing temperature of 85°C. A mixture of the above listed monomers and 4 parts by weight of 2,2'-azobis-(2-methyl propionitrile), hereinafter called AIBN, in the total amount of 208 grams is added in a dropwise fashion over a period of one and a half hours to the reaction mixture which is maintained at 85°C. After the monomer addition is complete, 0.5 grams of AIBN (dissolved in 20 grams of toluene) is added dropwise. The refluxing is continued for an additional one-half hour to complete the polymerization.

The solution is poured into shallow stainless steel trays. These trays are placed in a vacuum oven and the solvent evaporated therefrom. As the solvent is removed, the copolymer becomes more concentrated. The temperature of the vacuum oven is raised to 110°C. Drying is continued until the solvent content of the copolymer is below 3 percent. The trays are cooled and the copolymer collected and ground to pass through a 20 mesh screen.

The cured finish obtained from the powder coating composition utilizing the above film-former demonstrates good physical properties, good metal particle orientation and good depth variation of the metal particles.

EXAMPLE 48

The procedure of Example 1 is repeated except for the difference that a functionally equivalent amount of a self-crosslinking copolymer is substituted for the epoxy-functional copolymer and the azelaic acid.

The self-crosslinking copolymer used in this example is prepared from the following listed components in the manner hereinafter described:

| Reactants | Grams |
|---|---|
| glycidyl methacrylate | 30 |
| methacrylic acid | 21 |
| methyl methacrylate | 129 |
| butyl methacrylate | 120 |

The monomers above listed are mixed with 12 grams of an initiator, i.e., t-butylperoxypivate. Three hundred grams of benzene if charged into a one liter flaks which is equipped with a dropping funnel, condenser, stirrer, thermometer and nitrogen inlet. The monomer mixture is placed in the dropping funnel. The flaks is heated to 80°C., and a refluxing of the solvent is achieved While maintaining the reaction temperature at 80°C., the monomer mixture is added in a dropwise fashion over a two-hour period. After the addition is complete, the reaction is continued for another two hours. The contents of the flaks are then cooled to room temperature.

One hundred milliters of the resultant solution are mixed with 0.3 grams of poly (20ethylhexyl acrylate). The mixture is dispersed and then is dried in a vacuum oven at 70°C. The powder coating obtained is ground to pass through a 200 mesh sieve.

The cured finish obtained from the powder coating composition utilizing the above film-former demonstrates good physical properties, good metal particle orientation and good depth variation of the metal paticles.

EXAMPLE 49

A series of powder paints, A-E are prepared from the following materials in the manner hereinafter set forth and later electrostatically sprayed as in Example 1 for test purposes.

Step I. The materials listed below are thoroughly mixed.

| | A | B | C | D | E |
|---|---|---|---|---|---|
| | PARTS BY WEIGHT | | | | |
| 1. aluminum paste (65% metal) | 30.00 | 30.00 | 30.00 | 30.00 | 30.00 |
| 2. thermoplastic coating material of paragraph (a) Example 1 | 9.75 | 13.65 | 19.5 | 29.25 | 39.00 |
| % based on weight of aluminum | 50.00 | 70.00 | 100.00 | 150.00 | 200.00 |
| 3. poly(lauryl acrylate) | 0.06 | 0.08 | 0.12 | 0.18 | 0.23 |
| 4. methylene chloride | 250.00 | 250.00 | 250.00 | 250.00 | 250.00 |

Step II. This mixture is then spray dried as in the preceding examples and a product comprising aluminum flakes encapsulated in a thermoplastic coating is obtained wherein the relative weights of the components are as follows:

| | A | B | C | D | E |
|---|---|---|---|---|---|
| | PARTS BY WEIGHT | | | | |
| 1. aluminum flakes | 19.5 | 19.5 | 19.5 | 19.5 | 19.5 |
| 2. thermoplastic coating material from Step I | 9.75 | 13.65 | 19.50 | 29.25 | 39.00 |
| 3. poly(laurylacrylate) | 0.06 | 0.08 | 0.12 | 0.18 | 0.23 |

Step III. These encapsulated aluminum flakes are sieved through a 44 micron screen. All particles left on the screen are rejected.

Step IV. A non-metallic powder mixture is made up by thoroughly mixing the below listed materials after which the mixture is pulverized and sieved through a 75 micron screen. All particles left on the screen are rejected.

|  | A | B | C | D | E |
|---|---|---|---|---|---|
|  | PARTS BY WEIGHT | | | | |
| 1. Resin* | 166 | 166 | 166 | 166 | 166 |
| 2. Azelaic acid | 22.64 | 22.64 | 22.64 | 22.64 | 22.64 |
| 3. Poly(lauryl acrylate) | 1.34 | 1.34 | 1.34 | 1.34 | 1.34 |
| 4. Pigments | | | | | |
| (a) thalo green | 2.03 | 2.03 | 2.04 | 2.06 | 2.08 |
| (b) yellow iron oxide | 8.04 | 8.07 | 8.11 | 8.18 | 8.25 |

*epoxy-functional copolymer of Example 18.

Step V. An evenly mixed blend is formed from the encapsulated aluminum flakes of Step III and the non-metallic powder mixture of Step IV in the following relative proportions:

|  | A | B | C | D | E |
|---|---|---|---|---|---|
|  | PARTS BY WEIGHT | | | | |
| 1. encapsulated aluminum flakes | 2.255 | 2.556 | 3.009 | 3.764 | 4.518 |
| 2. nonmetallic powder | 97.745 | 97.444 | 96.991 | 96.236 | 95.482 |

The relative concentrations of ingredients in each of these blends is as follows:

| Ingredient | Parts by Weight |
|---|---|
| aluminum | 1.50 |
| film-former | 93.57 |
| phthalo green | 0.99 |
| yellow iron oxide | 3.93 |

Each of the powders thus obtained are blended with nickel powder in an amount such that the weight ratio of nickel to aluminum is 2:1 and are sprayed on electrically grounded substrates and baked as in Example 1. Metal pigment spacing and orientation is best when the resin encapsulation on the aluminum flakes is in the range of 50 to 70 weight percent of the aluminum with the very best achieved with paint A (50 weigt percent encapsulation based on the weight of aluminum flakes).

EXAMPLE 50

Aluminum flakes are encapsulated as in Example 1 except for the differences that solvents other than methylene chloride, i.e., toluene, xylene, acetone, hexane and methyl ethyl ketone, are used to disperse the film-forming material and aluminum flakes prior to spray drying. The spray drying operation is adjusted in conformance with the relative volatities of the solvent used in each test. The encapsulated flakes thus prepared are incorporated into the powder paint of Example 1, electrostatically sprayed upon substrates and the substrates are baked as in Example 1.

Hydrocarbons, alcohols and ketones boiling in the range of 50°C. to 152°C., preferably 50°C. to 90°C., can be used for this purpose. The amount of solvent used is in excess of the combined weights of the aluminum flakes and the film-former used for encapsulation. Advantageously, the amount of solvent used is in the range of about 3 to 100 times the combined weights of film-former and aluminum flakes.

Apparatus and methods for electrostatically spraying powder coating materials are illustrated and described in U.S. Pat. Nos. 3,536,514; 3,595,678; and 3,598,629.

The term "copolymer" is used herein to mean a polymer formed from two or more different monomers.

Many modifications of the foregoing examples will be apparent to those skilled in the art in view of this specification. It is intended that all such modifications which fall within the scope of this invention be included within the appended claims.

The disclosures of U.S. Pat. application Ser. No. 442,291, filed Feb. 12, 1974 by Santokh S. Labana et al and entitled "Powder Coating Compositions Including Glycidyl Ester-Modified Copolymer" are incorporated herein by reference.

Any and all disclosures appearing in the claims and not specifically appearing in the body of this specification are herewith incorporated in the body of this specification.

We claim:

1. In a powder paint which exclusive of catalysts, antistatic agents, plasticizers and flow control agents, the same being known and optional additives to powder paints, consists essentially of aluminum flakes, non-metal pigment and a particulate, organic, film-former, the improvement wherein
   A. said non-metal pigment comprises 0 to about 22 weight percent of said powder paint,
   B. said aluminum flakes comprise about 0.005 to about 25 weight percent of said powder paint and are encapsulated prior to admixture with said particulate, organic, film-former with about 2 to about 200 parts by weight of a continuous coating of a thermoplastic organic, film-former per 100 parts by weight aluminum flakes, said thermoplastic, organic, film-former consisting essentially of thermoplastic, organic film-formers selected from the group consisting of
   1. polymers of alpha-beta olefinically unsaturated monomers of which about 51 to about 100 weight percent are acrylic monomers aid 0 to about 49 weight percent are monovinyl hydrocarbons,
   2. polyamides,
   3. polyesters,
   4. homopolymers of monovinyl hydrocarbons,
   5. cellulose acetate, and
   6. cellulose butyrate,
C. nickel powder is dispersed in said powder paint, the weight ratio of said nickel powder to the encapsulated aluminum flakes being between about 1:4 and about 5:1, and
D. said particulate, organic film-former is
   1. a thermoplastic, particulate, film-former that is a polymer of alpha-beta olefinically unsaturated monomers of which about 51 to about 100 weight percent are acrylic monomers and 0 to about 49 weight percent are monovinyl hydrocarbons, and
   2. thermosettable, particulate, film-formers consisting essentially of a copolymer having average molecular weight ($\bar{M}_n$) in the range of about 1500 to about 15,000 and gloss transition temperature in the range of about 40°C. to about 90°C., bearing functional groups provided by constituent monomers selected from the group consisting of glycidyl esters of a monoethylenically unsaturated carboxylic acid, $C_5 - C_7$ monohydroxy acrylates, $C_5 - C_7$ monohydroxy methacrylates and alpha-beta olefinically unsaturated amides and wherein at least above 50 weight percent of the constituent monomers are acrylic monomers and the remainder weight percent, if any, of the constituent monomers consist essentially of $C_8 - C_{12}$ monovinyl hydrocarbons, said copolymer being self-crosslinkable or employed in combination with a monomeric or polymeric crosslinking agent that is capable of reacting with said functional groups on said copolymer.

2. A powder paint in accordance with claim 1 wherein the weight ratio of said nickel powder to said encapsulated aluminum flakes is between about 1.5:1 and about 2.5:1.

3. A powder paint in accordance with claim 1 wherein the encapsulation of said aluminum flakes is in the amount of about 2 to about 30 parts by weight of thermoplastic, organic, film-former per 100 parts by weight of said aluminum flakes.

4. A powder paint in accordance with claim 1 wherein the encapsulation of said aluminum flakes is in the amount of about 30 to about 70 parts by weight of thermoplastic, organic, film-former per 100 parts by weight of said aluminum flakes.

5. A powder paint in accordance with claim 1 wherein said particulate, organic, film-former is thermosettable and said copolymer bearing functional groups is a copolymer of about 5 to about 20 weight percent of glycidyl ester of a monoethylenically unsaturated carboxylic acid, about 2 to about 10 weight percent of a hydroxy acrylate or methacrylate and about 70 to about 93 weight percent of esters of a $C_1 - C_8$ monohydric alcohol and acrylic or methacrylic acid and is employed with a crosslinking agent selected from the group consisting of dicarboxylic acids and anhydrides of dicarboxylic acids.

6. A powder paint in accordance with claim 1 wherein said particulate, organic, film-former is thermosettable and said copolymer bearing functional groups is a copolymer of about 5 to about 20 weight percent of a glycidyl ester of a monoethylenically unsaturated carboxylic acid, about 2 to about 10 weight percent of an alpha-beta olefinically unsaturated amide and about 70 to about 93 weight percent of esters of a $C_1 - C_8$ monohydric alcohol and acrylic or methacrylic acid and is employed with a cross-linking agent selected from the group consisting of dicarboxylic acids and anhydrides of dicarboxylic acids.

7. A powder paint in accordance with claim 1 wherein said particulate, organic, film-former is thermosettable and said copolymer thereof is a copolymer having as its sole functionality hydroxyl groups and is employed with a melamine crosslinking agent.

8. A powder paint in accordance with claim 1 wherein said thermoplastic, organic, film-former encapsulating said aluminum flakes is a homopolymer of acrylonitrile or methacrylonitrile.

9. A powder paint in accordance with claim 1 wherein said thermoplastic, organic, film-former encapsulating said aluminum flakes is poly (acrylonitrile).

10. A powder paint in accordance with claim 1 wherein said thermoplastic, organic film-former encapsulating said aluminum flakes is poly (hexamethylene adipamide).

11. A powder paint in accordance with claim 1 wherein said thermoplastic, organic, film-former encapsulating said aluminum flakes is poly (styrene).

12. A powder paint in accordance with claim 1 wherein said thermoplastic, organic, film-former encapsulating said aluminum flakes is a homopolymer of an acrylate or methacrylate which is an ester of a $C_1 - C_8$ monohydric alcohol and acrylic or methacrylic acid.

13. A powder paint in accordance with claim 5 wherein said thermoplastic, organic, film-former encapsulating said aluminum flakes is a copolymer of about 51 to about 100 weight percent of esters of $C_1 - C_8$ monohydric alcohols and acrylic or methacrylic acid and 0 to about 49 percent of $C_8 - C_{12}$ monovinyl hydrocarbons.

14. A powder paint in accordance with claim 1 wherein said thermoplastic, organic, film-former encapsulating said aluminum flakes is a copolymer or homopolymer of esters of acrylic or methacrylic acid and a $C_1 - C_8$ alcohol.

15. A powder paint in accordance with claim 1 wherein said particulate, organic, film-former is a thermoplastic, particulate, film-former and has average molecular weight ($\bar{M}_n$) in the range of about 30,000 to about 80,000 and a glass transition temperature in the range of about 60°C. to about 110°C.

16. A powder paint in accordance with claim 1 wherein said thermoplastic, organic, film-former is cellulose butyrate.

17. A powder paint in accordance with claim 1 wherein said thermoplastic, organic, film-former is cellulose acetate.

18. A powder paint in accordance with claim 1 wherein said particulate, organic, film-former is a thermosettable particulate, film-former consisting essentially of a copolymer of monoethylenically unsaturated monomers of which about 5 to about 20 weight percent of the constituent monomers are glycidyl esters of a monoethylenically unsaturated carboxylic acid, in excess of 50 weight percent of the constituent monomers are acrylic monomers, and a crosslinking agent reactable with said copolymer and selected from the group consisting of dicarboxylic acids and anhydrides of dicarboxylic acids.

19. A powder paint in accordance with claim 1 wherein said particulate, organic, film-former consists essentially of a copolymer of about 5 to about 20 weight percent of a glycidyl ester of a monoethylenically unsaturated carboxylic acid and about 80 to about 95 weight percent of esters of a $C_1 - C_8$ monohydric alcohol and acrylic or methacrylic acid and a crosslinking agent selected from the group consisting of dicarboxylic acids and anhydrides of dicarboxylic acids.

20. A powder paint in accordance with claim 1 wherein said particulate, organic, film-former consists essentially of a copolymer of a monoethylenically unsaturated carboxylic acid, about 2 to about 10 weight percent of a $C_5 - C_7$ hydroxy acrylate or methacrylate and about 70 to about 93 weight percent of esters of a $C_1 - C_8$ monohydric alcohol and a crosslinking agent selected from the group consisting of dicarboxylic acids and anhydrides of dicarboxylic acids.

21. A powder paint in accordance with claim 1 wherein said particulate, organic, film-former consists essentially of a copolymer of a monoethylenically unsaturated carboxylic acid, about 2 to about 10 weight percent of acrylamide or methacrylamide and about 70 to about 93 weight percent of esters of a $C_1 - C_8$ monohydric alcohol and acrylic or methacrylic acid and a cross-linking agent selected from the group consisting of dicarboxylic acids and anhydrides of dicarboxylic acids.

* * * * *